(12) United States Patent
Tolgu et al.

(10) Patent No.: US 7,921,432 B2
(45) Date of Patent: Apr. 5, 2011

(54) MANAGED APPLICATION EXECUTION APPLICATION PROGRAMMING INTERFACE AND SCHEMA

(75) Inventors: Karl Tolgu, Seattle, WA (US); Ahmad M. El Husseini, Kirkland, WA (US); Dmitry Zhiyanov, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 908 days.

(21) Appl. No.: 11/378,881

(22) Filed: Mar. 17, 2006

(65) Prior Publication Data
US 2007/0220527 A1   Sep. 20, 2007

(51) Int. Cl.
*G06F 9/44* (2006.01)
*G06F 9/45* (2006.01)

(52) U.S. Cl. .......................... 719/328; 717/136

(58) Field of Classification Search .................. 719/328, 719/330; 717/136
See application file for complete search history.

(56) References Cited

U.S. PATENT DOCUMENTS

| | | | |
|---|---|---|---|
| 6,041,362 A | 3/2000 | Mears et al. | |
| 6,167,564 A | 12/2000 | Fontana et al. | |
| 6,334,158 B1 | 12/2001 | Jennyc et al. | |
| 6,360,249 B1 | 3/2002 | Courts et al. | |
| 6,393,456 B1 | 5/2002 | Ambler et al. | |
| 6,484,177 B1 | 11/2002 | Van Huben et al. | |
| 6,754,672 B1 | 6/2004 | McLauchlin | |
| 6,854,120 B1 | 2/2005 | Lo et al. | |
| 6,981,222 B2 | 12/2005 | Rush et al. | |
| 2001/0042092 A1 | 11/2001 | Kudo et al. | |
| 2002/0099583 A1 | 7/2002 | Matusek et al. | |
| 2002/0111820 A1 | 8/2002 | Massey | |
| 2002/0198800 A1 | 12/2002 | Shamrakov | |
| 2003/0172371 A1 | 9/2003 | Offenmuller | |
| 2003/0217035 A1 | 11/2003 | Lai | |
| 2003/0236859 A1* | 12/2003 | Vaschillo et al. | 709/218 |
| 2004/0010496 A1 | 1/2004 | Behrendt et al. | |
| 2004/0163091 A1* | 8/2004 | Brill | 719/328 |
| 2005/0033588 A1 | 2/2005 | Ruiz et al. | |
| 2005/0049882 A1 | 3/2005 | Sawka | |
| 2005/0246677 A1* | 11/2005 | Mountain et al. | 717/100 |

FOREIGN PATENT DOCUMENTS
WO    WO 00/57311    9/2000

OTHER PUBLICATIONS

Bussler, Christoph et al., "A Conceptual Architecture for Semantic Web Enabled Web Services," *SIGMOD Record*, vol. 31, No. 4, pp. 24-29 (Dec. 2002).

(Continued)

*Primary Examiner* — Andy Ho
*Assistant Examiner* — Charles E Anya
(74) *Attorney, Agent, or Firm* — Marshall, Gerstein & Borun LLP

(57) ABSTRACT

Managed application programming interfaces (APIs), schemas and procedures receives a managed API call from an application, and maps the managed API call to an unmanaged API call. Managed data types and managed data objects of the managed API call are mapped to corresponding unmanaged data types and data objects. A request resulting from the unmanaged API call is dispatched to and interpreted by an unmanaged programming language interpreter, which executes the request in an unmanaged programming language. An unmanaged response to the request is mapped to a corresponding managed response, which is provided to the managed application.

18 Claims, 6 Drawing Sheets

OTHER PUBLICATIONS

Bussler, Christoph, "The Role of Semantic Web Technology in Enterprise Application Integration," *IEEE*, pp. 1-7 (2003).

"Enterprise Resource Planning: Enterprise Business Adapter," [online], [retrieved Jan. 9, 2006], retrieved from the Internet: <URL:http://www.mindtree.com/erp/businesss-adapter.php>.

Lee, Jinyoul, et al., "Enterprise Integration with ERP and EAI," *Communications of the ACM*, vol. 46, No. 2, pp. 54-60 (Feb. 2003).

Shelp, Joachim, et al., "Extending the Business Engineering Framework for Application Integration Purposes," *2005 ACM Symposium on Applied Computing*, pp. 1333-1337 (2005).

"Supply Chain and ERP Integration," [online], [retrieved Jan. 9, 2006], retrieved from the Internet: <URL:http://www.seagullsoftware.com/solutions/business/supplychain_erp.html>.

Themisteocleous, Marinos, et al., "ERP Problems and Application Integration Issues: An Empirical Survey," *Proceedings of the 34th Hawaii International Conference on System Sciences* -2001, © IEEE, pp. 1-10 (2001).

* cited by examiner

MANAGED APPLICATION EXECUTION APPLICATION PROGRAMMING INTERFACE AND SCHEMA

BACKGROUND

Integration of other systems and applications is an important feature of any server-based product that automates processes and manages data. In particular, with an enterprise resource planning (ERP) system there is often a need to support systems and applications that are based upon different programming languages. A client application based upon a particular interoperability standard, such as Component Object Model (COM), allowed integration with an ERP system based upon a programming language, such as X++, different from the programming language of the client application. The ERP system included an interoperability component which provided a mechanism for the client application to invoke client-side classes, provided an execution environment for client-side classes and allowed client-side classes to call server-side classes, and vice versa, where the client-side and server-side classes were written in a programming language different from the client application. For example, an ERP server having a COM interoperability component exposed X++-based ERP components to client applications that were written in a non-X++ programming language but based upon the COM interoperability standard. COM-based client applications could integrate with the enterprise resource planning server, despite different programming languages, and X++ code was executed from the COM execution environment.

In many cases, applications were built based on different type systems or datatypes (e.g., strings, decimal handling, values, etc.) than the type system of the ERP server. For example, applications were built based on managed code. Generally, managed code is programming code that has its execution managed by a generalized multi-language, reflective execution engine, such as .NET framework Common Language Runtime (CLR). By contrast, any language that is not a managed code may be referred to as an unmanaged language, such as X++. Likewise, any application that is not based upon a managed code may be referred to as an unmanaged application. In some cases, "unmanaged" may also be understood as "native." A managed programming language generally has a different type system than unmanaged programming languages. Accordingly, parameter types, data types, object types, etc. are different among managed and unmanaged programming languages and applications. As a result, an enterprise resource planning server should support different programming languages that utilize and support different type systems, such as managed and unmanaged programming languages, when interacting with applications and executing requests.

The unmanaged interoperability component, such as a COM-based interoperability component, did not have a managed application programming interface (API) and did not easily integrate with client applications based on managed code. In order to write managed code that interacted with the unmanaged interoperability component, managed applications utilized unmanaged (e.g., COM) wrappers around managed (e.g., .NET Framework) objects, and the unmanaged wrappers were used to interact with the unmanaged API of the interoperability component. The use of unmanaged wrappers required an additional layer of code in order to bridge the managed application and the unmanaged interoperability component, and increased the complexity of the managed application. Further, requests and data types from the managed application required mapping (also referred to as marshalling) from the managed application to the unmanaged interoperability standard (e.g., COM), and then from the unmanaged interoperability standard to the unmanaged programming code (e.g., X++) within the enterprise resource planning server. As a result, the use of wrappers was inefficient and ineffective because the managed application's usability and maintainability could be impacted, and the managed application's overall performance could be degraded.

SUMMARY

A managed interoperability component allows managed application to interact directly with an unmanaged programming language using a managed API. Broadly, an API call of a first type system, such as a managed API call, is received and mapped to a corresponding API call of a second type system, such as an unmanaged API call. Managed data objects may be mapped to corresponding unmanaged data objects, managed data types may be mapped to corresponding unmanaged data types, and managed parameters may be mapped to corresponding unmanaged parameters. The use of these calls and schemas is expected to increase the integration between applications based on a type system, such as managed applications, and ERP systems based on a different type system, such as unmanaged programming languages, while maintaining or improving the client application's usability, maintainability and overall performance.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
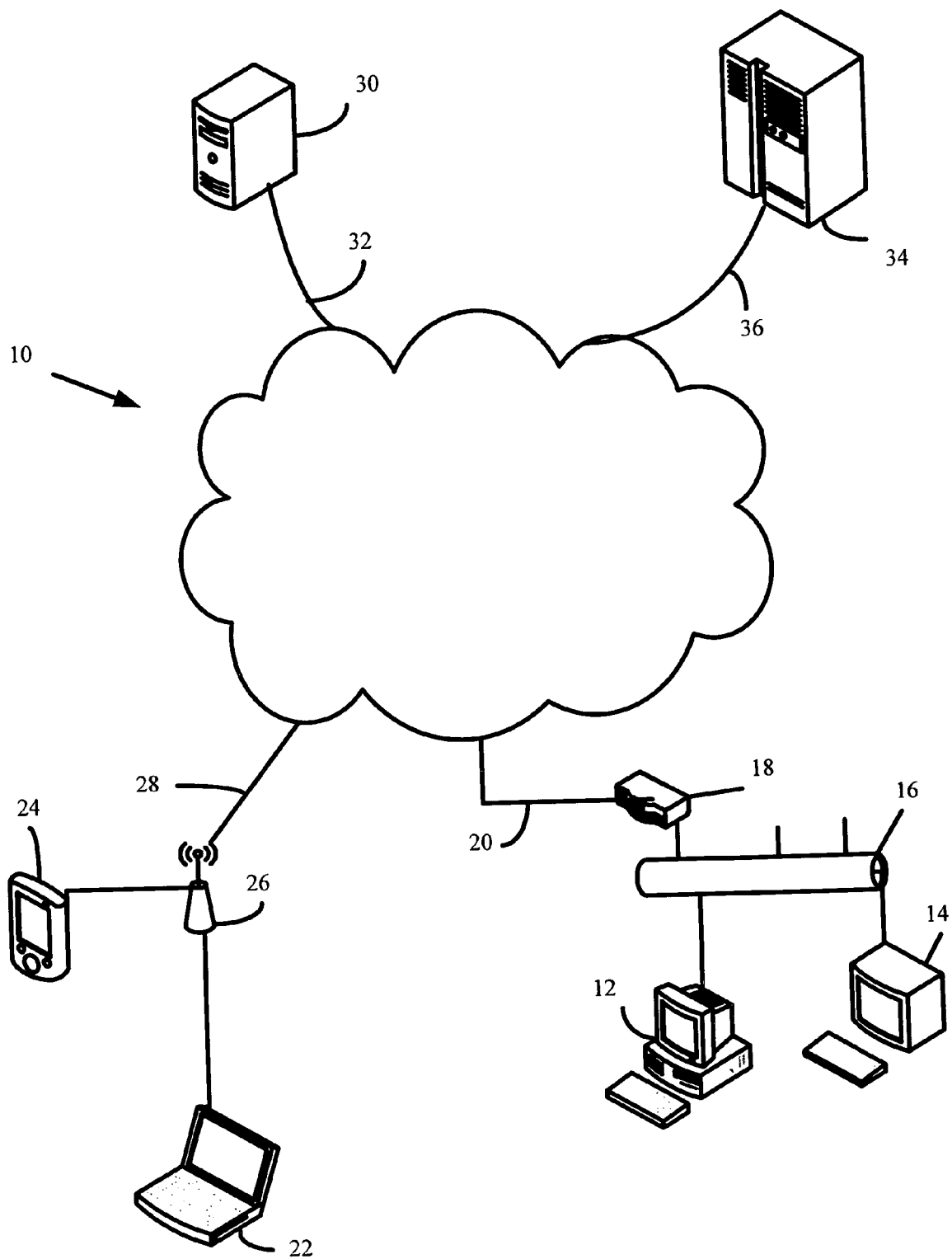
FIG. 1 is a simplified and representative block diagram of a computer network.
Figure 2:
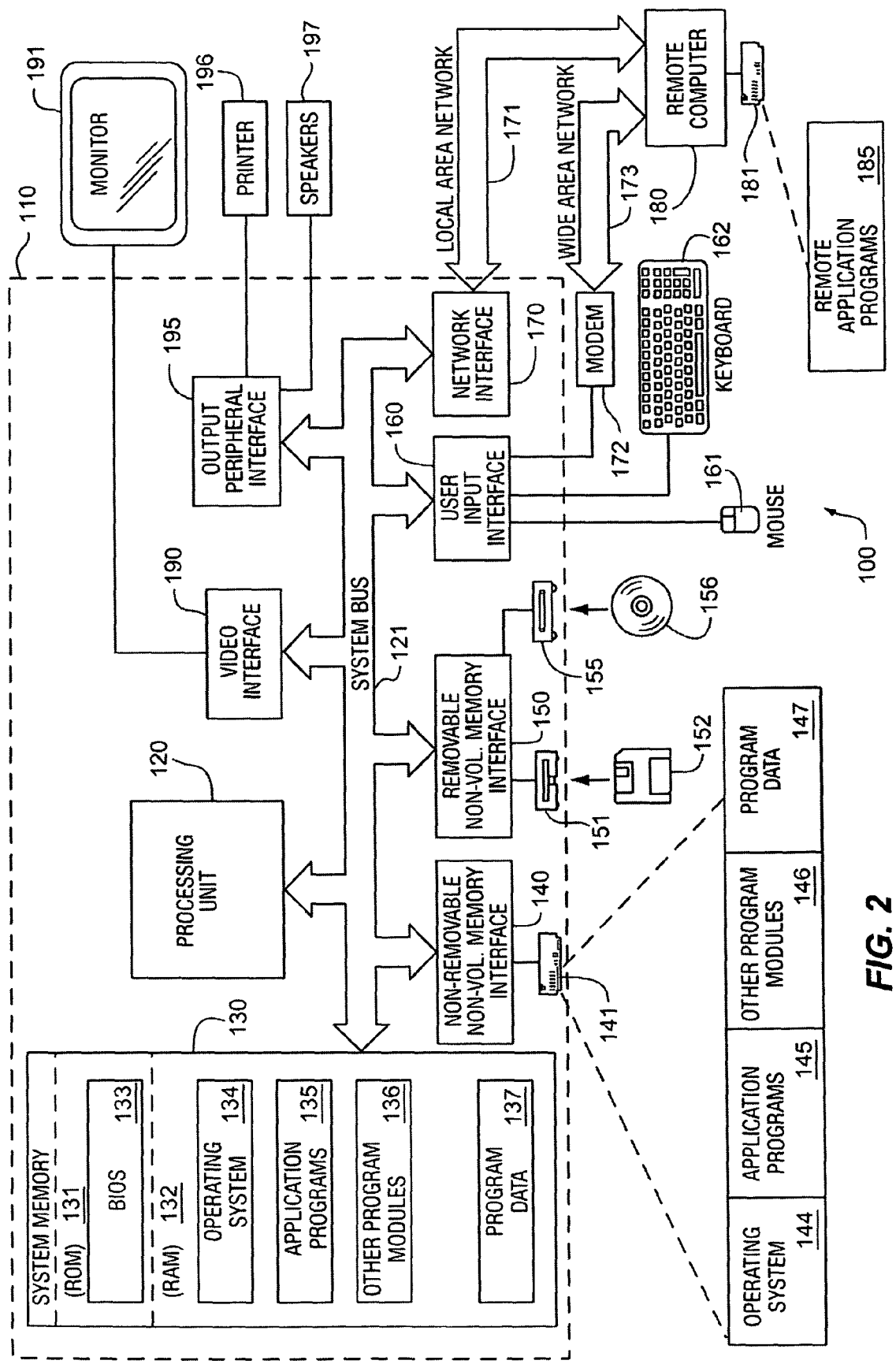
FIG. 2 is a block diagram of a computer that may be connected to the network of FIG. 1.

FIGS. 1 and 2 provide a structural basis for the network and computational platforms related to the instant disclosure.

FIG. 1 illustrates a network 10. The network 10 may be the Internet, a virtual private network (VPN), or any other network that allows one or more computers, communication devices, databases, etc., to be communicatively connected to each other. The network 10 may be connected to a personal computer 12, and a computer terminal 14 via an Ethernet 16 and a router 18, and a landline 20. The Ethernet 16 may be a subnet of a larger Internet Protocol network. Other networked resources, such as projectors or printers (not depicted), may also be supported via the Ethernet 16 or another data network. On the other hand, the network 10 may be wirelessly connected to a laptop computer 22 and a personal data assistant 24 via a wireless communication station 26 and a wireless link 28. Similarly, a server 30 may be connected to the network 10 using a communication link 32 and a mainframe 34 may be connected to the network 10 using another communication link 36. The network 10 may be useful for supporting peer-to-peer network traffic.

FIG. 2 illustrates a computing device in the form of a computer 110. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 2 illustrates operating system 134, application programmings 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programmings 145, other program modules 146, and program data 147. Note that these components can either be the same as or different from operating system 134, application programmings 135, other program modules 136, and program data 137. Operating system 144, application programmings 145, other program modules 146, and program data 147 are given different numbers here to illustrate that, at a minimum, they are different copies. A user may enter commands and information into the computer 20 through input devices such as a keyboard 162 and cursor control device 161, commonly referred to as a mouse, trackball or touch pad. A camera 163, such as web camera (webcam), may capture and input pictures of an environment associated with the computer 110, such as providing pictures of users. The webcam 163 may capture pictures on demand, for example, when instructed by a user, or may take pictures periodically under the control of the computer 110. Other input devices (not shown) may include a microphone, joystick, game pad, satellite dish, scanner, or the like. These and other input devices are often connected to the processing unit 120 through an input interface 160 that is coupled to the system bus, but may be connected by other interface and bus structures, such as a parallel port, game port or a universal serial bus (USB). A monitor 191 or other type of display device is also connected to the system bus 121 via an interface, such as a graphics controller 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the input interface 160, or other appropriate mechanism. In a networked environment, program modules depicted relative to the computer 110, or portions thereof, may be stored in the remote memory storage device. By way of example, and not limitation, FIG. 2 illustrates remote application programmings 185 as residing on memory device 181.

The communications connections 170, 172 allow the device to communicate with other devices. The communications connections 170, 172 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

Figure 3:
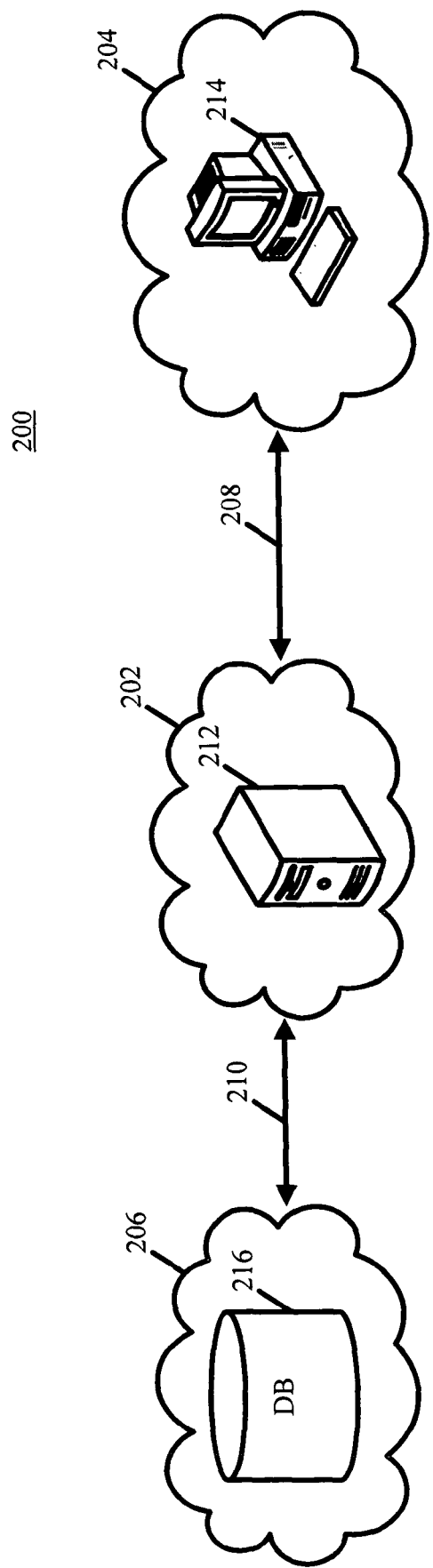
FIG. 3 is a representative block diagram of a system for allowing managed client applications to interact with an unmanaged server programming language.

FIG. 3 may depict an exemplary client/server network 200, such as an enterprise resource planning system, that may be similar to or coupled to the network 10 of FIG. 1. A client/server network 200 may include individual systems 202, 204, 206 coupled by networks 208, 210. The networks 208, 210 may be wired or wireless and may support Internet protocol version 6 (IPv6) and secure dedications protocol, such as secured sockets layer (SSL). In one example, the Internet may be utilized as one or more of the networks 208, 210. System 202 is a server system which may include one server 216 or multiple servers. The server system 202 may be a enterprise resource planning (ERP) system or other business enterprise server system, an SQL or other database management server system, or a messaging and enterprise collaboration server system, though different server types or server utilizations may be included. The server system 202 may include an interoperability component to enable integration between managed client applications and unmanaged programming code of the server system 202, and facilitate the execution of requests generated as a result of managed application programming interface (API) calls in an unmanaged programming language or other unmanaged execution environment.

Generally, managed refers to a method of cooperation between executing code and the runtime, such that at any point of execution, the runtime may stop an executing processor and retrieve information specific to the current processor instruction address. As such, managed code may be any code or programming language that has its execution managed by a generalized multi-language, reflective execution engine, and a managed application may be any application built using managed code. By contrast, unmanaged may refer to anything that is not managed. For example, unmanaged code may be any code or programming language that is not managed and an unmanaged application may be any application that is not developed based on managed code or programming language.

System 204 is a client system that includes a network communication device 214, including, but not limited to, a personal computer, telephone, a personal digital assistant, a set-top box, television, and entertainment system, and the like. In one example, the network communication device 214 may include, or be operatively coupled to, a client application, which may be a managed application, having a different type system than what is utilized for execution by the server system 202. In one example, the managed application is built using .NET and executes in the .NET Common Language Runtime (CLR) or another generalized multi-language, reflective execution engine that allows application code of various programming languages to run. The managed application may generate calls or requests to the server system 202 to access an unmanaged component in the server system 202 or cause execution of an unmanaged software application in the server system 202, including, but not limited to, an operating system, an application, and the like.

System 206 includes a database 216 operatively coupled to the server system 202. Data within the database 216 may be managed by the server system 202 and/or applications stored within the database 216 may be accessed by the server system 202. In one example, using the above system 200, the server 212 may enable a managed client application to interact with an unmanaged server programming language, and, in particular, may enable a managed client application to interact directly with an unmanaged programming language of the server system 202, while bypassing an interoperability standard, such as COM. A managed API call from a managed client application is mapped or marshaled from the managed language, such as .NET, to the unmanaged language of the server system 202, such as X++. The resultant request associated with the call is dispatched to an unmanaged language interpreter resident locally in the interoperability component for execution. Alternatively, the unmanaged language interpreter may be resident remotely in an application object server which may be an application server that executes application logic for the client, and the request may be executed remotely.

Although the client system 204 is shown to include one network communication device 214, it should be understood that different numbers of network communication devices may be utilized. Likewise, the server system 202 may include different numbers of servers and the database system 206 may include different numbers of databases. Further, while the server 212, the network communication device 214 and the database 216 are each shown to be provided within their own systems 202, 204, 206, it should be understood that the server 212, the network communication device 214 and/or the database 216 may be provided within the same system. It should also be understood that multiple systems may be provided, including hundreds or thousands of client systems. Although the following disclosure generally describes the interaction between one server 212 and one client system 204, it should be understood that multiple servers may operate simultaneously, each with one or more client network communication devices and/or with one or more client systems.

Further, although the following disclosure generally describes the integration and interaction between a managed programming/execution language (and an application written therefrom) and an unmanaged programming language (and a system based therefrom), it should be understood that the following disclosure is equally applicable to the interaction between applications, systems and languages of different type systems, which defines how a programming language classifies values and variables into various types, and how the programming language manipulates and interacts those values and variables, or otherwise provide rules for the semantics of variables and values. For example, different types systems may results in different parameter types, different data types and different data objects. As a result, an API call may include data objects, data types and/or data parameters based upon a programming language having a different type system than the programming language of the system responding to the API call. Various examples of computer code are provided below, some of which are written in .NET programming language, X++ programming language, which is a simple object-oriented, interpretive language, or C++ programming code, although various other programming languages, including other object-oriented languages, may be utilized.

Figure 4:
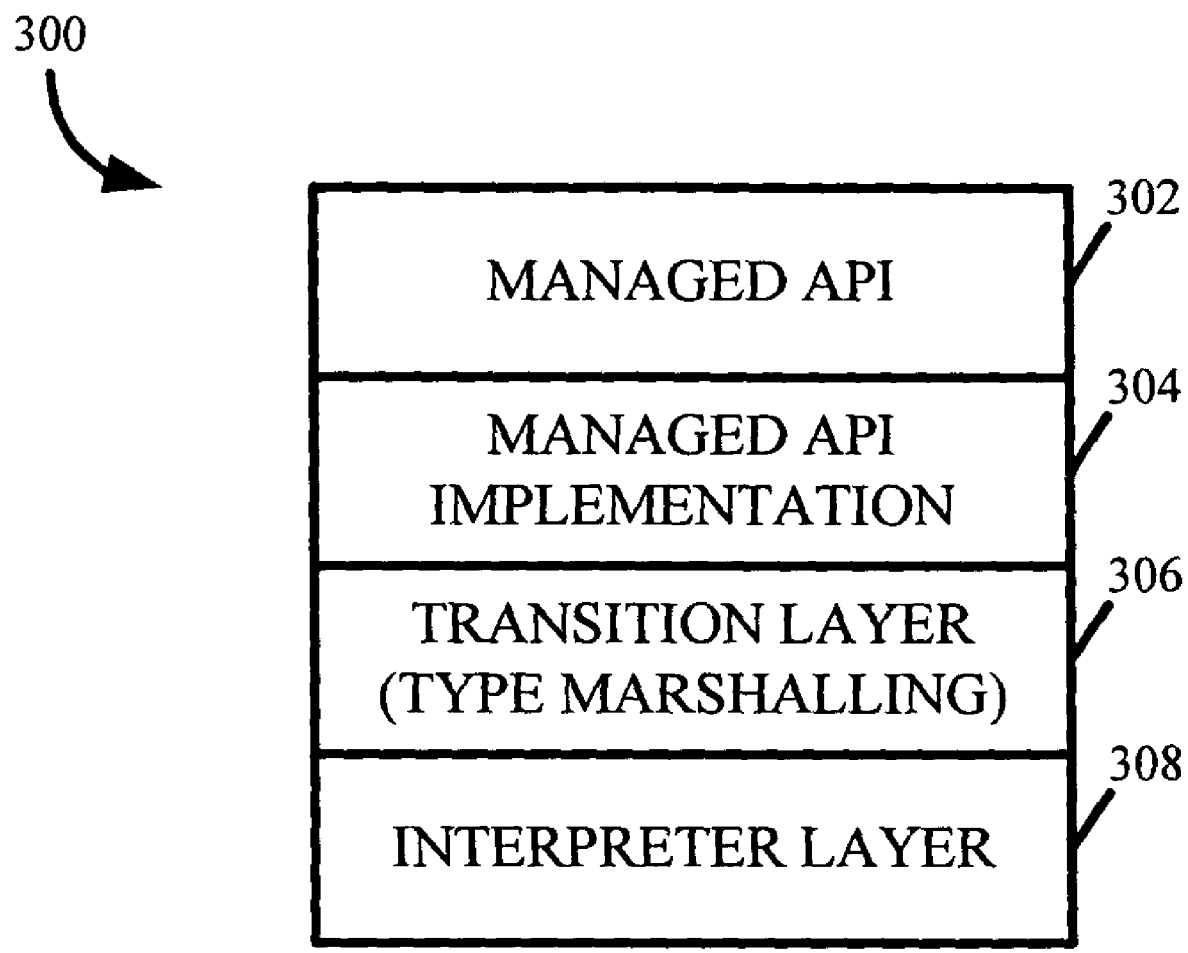
FIG. 4 is a diagram representative of various logical layers of an interoperability component.

FIG. 4 is an example of various logical layers 300 of a managed interoperability component of the server system 202, which may be a software application resident in a memory of the server 212. Referring to FIG. 4, the logical layers 300 of the managed interoperability component may include a managed API layer 302, a managed API implementation layer 304, a transition layer 306 and an interpreter layer 308. Each of the logical layers 302, 304, 306, 308 may be distinct, yet functionally interact with one another.

The managed API layer 302 provides a set of managed APIs and API methods which may be publicly exposed to provide access to the unmanaged execution language of the server system 202 from managed programming languages of managed client applications. In other words, the managed API layer 302 provides an entry point for various managed API calls from the managed client application which calls a particular managed API method. Generally, the managed API layer 302 does not have any implementation in the unmanaged programming language.

The managed API implementation layer 304 may provide a runtime environment for requests associated with calling the managed APIs. The managed API implementation layer 304 may include a set of classes and helper functions defined in the managed language that uses the transition layer 306 to access and execute the unmanaged programming language. In particular, the managed API implementation layer 304 implements the managed API layer 302 by taking the managed API calls from the managed API layer 302 and passing the calls to the transition layer 306.

The transition layer 306 may engage in type marshaling, which marshals a managed API call from a managed layer (e.g., the managed API implementation layer 304) to an unmanaged layer (e.g., the interpreter layer 308) by mapping the managed API call to a corresponding unmanaged API call. In other words, the transition layer 306 provides interoperability between managed and unmanaged data types or data objects, by bringing the call or request from a managed layer to an unmanaged layer, and vice versa. In particular, a managed API call may include data objects which include data types which, in turn, include parameters, though the API call may include any combination of data object, data types and parameters. The data objects, data types and parameters of the API call may be based on a managed programming language that supports a different type system than the server system 202. The transition layer 306 may map managed parameters, managed data types and/or managed data objects to corresponding (e.g., equivalent) unmanaged parameters, unmanaged data types and/or unmanaged data objects in the unmanaged programming language. As such, the transition layer 306 may map a managed API call to a corresponding (e.g., equivalent) API call understood by an unmanaged layer by changing the parameters, data types and/or data objects from managed to unmanaged, and likewise may map parameters, data types and/or data objects of an unmanaged response to the API call to a response understood by a managed layer.

The interpreter layer 308 is an unmanaged interpreter layer which may interpret and execute a request in the unmanaged programming language either locally in the kernel of the managed interoperability component or remotely in the kernel of an application object server.

Figure 5:
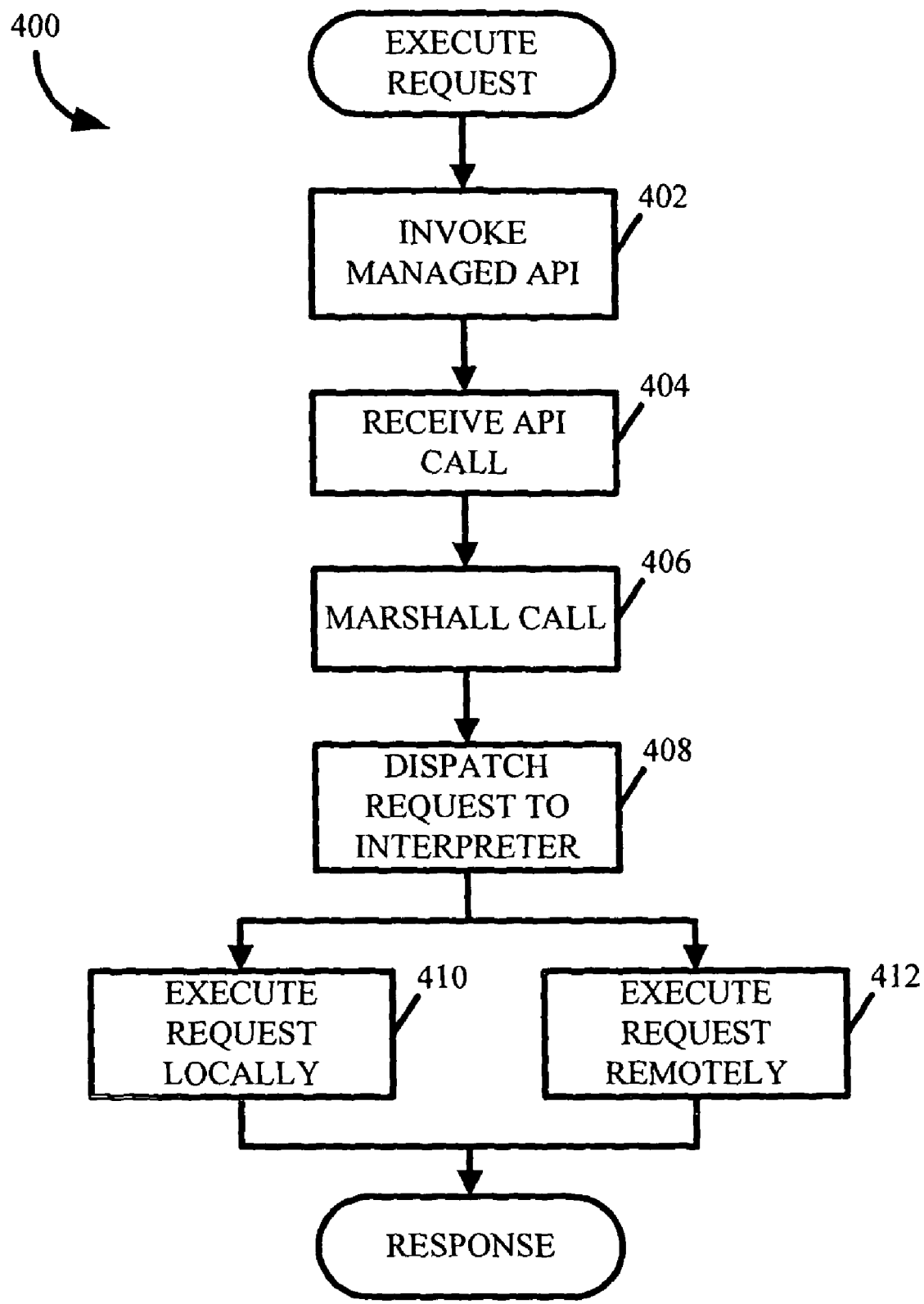
FIG. 5 is a flowchart representative of a routine for traversing a request through the logical layers of FIG. 4.

FIG. 5 is an example of a routine 400 which may be executed all or in part in the interoperability component kernel, and which may be utilized to receive a managed API call and marshal the call from a managed layer to an unmanaged layer in order to execute an associated request in the unmanaged programming language. Beginning at block 402, a managed API method defined and exposed in the managed API layer 302 may be called from a managed client application written in an managed programming language (e.g., .NET). The managed application may compile the managed API method as part of the managed client application. The managed interoperability component may receive the managed API call via the managed API layer 302 at block 404 and the transition layer 306 may marshal the managed API call from the managed layer to an unmanaged layer at block 406.

At block 406, the transition layer 306 may map the managed API call to a corresponding unmanaged API call. In particular, the parameters, data types and/or data objects may be changed from managed to unmanaged. For example, a managed parameter of the managed API call is mapped to a corresponding unmanaged parameter of the corresponding unmanaged API call. Likewise, a managed data type of the managed API call is mapped to a corresponding unmanaged data type of the corresponding unmanaged API call. Further, a managed data object of the managed API call is mapped to a corresponding unmanaged data object of the corresponding unmanaged API call.

Whether or not the transition layer 306 maps all or some of parameters, data types or data objects depends on the construction of the managed API call. For example, an API call with only parameters and data types would not result in mapping object types. Further, the construction of the managed API call may depend on the order in which mapping occurs. For example, a managed API call with multiple data objects some or all of which may include one or more data types, some or all of which in turn may include one or more parameters, may result in the routine 400 parsing out each data object, parsing out each data type of each data object and parsing out each parameter of each data type, with mapping occurring at each level. It should be understood that even with multiple data objects, data types and/or parameters, the mapping thereof may be done concurrently (e.g., multiple data objects concurrently, data types of different data objects concurrently, etc.). Further, it should be understood that an API call need not necessarily include all of data objects, data types and parameters, not does an API necessarily include parameters nested within data types or data objects, and data types nested within data objects. As such, the routine 400 is capable of mapping any API call of a type system to another API call of another type system regardless of its construction.

Once all of the parameters, data types and/or data objects have been mapped to unmanaged parameters, data types and/ or data objects, the transition layer 306 may dispatch the request associated with the unmanaged API call to the unmanaged programming language interpreter, such as an X++ interpreter, at block 408. The unmanaged programming language interpreter may be resident in the managed interoperability component at block 410 or in a remote application object server at block 412. The unmanaged programming language interpreter may then execute the request in the unmanaged programming language.

The following provides examples of managed API calls which may be sent by a managed application and received via the server system 202. As mentioned, the calls may be implemented using extensible markup language, such as XML, and all calls may be defined by the server system 202 to simplify and provide a common interface for different calls. Although C# style notation is used to described the schemas, the schemas are not limited thereto.

As explained above, the managed application programming interface layer 302 may expose a variety of managed application programming interfaces, which may be implemented in a variety of managed classes: Server, ServerBuffer, ServerContainer, ServerObject, ServerRecord. The Server class provides methods for connecting to the server system 202, creating managed objects (class objects, record objects, container objects, and buffer objects), executing transactions, etc. The ServerBuffer class provides methods for adding and retrieving data to and from a server system 202 buffer. ServerBuffer objects may be used with ServerContainer objects. The ServerContainer class provides methods for reading and modifying containers. The ServerObject class provides methods for calling methods of Server objects.

Object types supported within the Server, ServerObject and ServerRecord classes are provided in the following tables, with the corresponding variant type shown for each managed type.

| Managed Type | Variant Type |
| --- | --- |
| System.SByte | VT_I1 |
| System.Byte | VT_UI1 |
| System.Int16 | VT_I2 |
| System.UInt16 | VT_UI2 |
| System.Int32 | VT_I4 |
| System.UInt32 | VT_UI4 |
| System.Int64 | VT_I8 |
| System.Guid | N/A |
| System.Boolean | VT_BOOL |
| System.Runtime.InteropServices.ErrorWrapper | VT_ERROR |
| System.Single | VT_R4 |
| System.Double | VT_R8 |
| System.Decimal | VT_DECIMAL |
| System.Runtime.InteropServices.CurrencyWrapper | VT_CY |
| System.DateTime | VT_DATE |
| System.String | VT_BSTR |
| System.Runtime.InteropServices.DispatchWrapper | VT_DISPATCH |
| System.Runtime.InteropServices.UnknownWrapper | VT_UNKNOWN |
| ServerObject | VT_SERVER |
| ServerRecord | VT_RECORD |
| ServerBuffer | VT_BUFFER |
| ServerContainer | VT_CONTAINER |
| System.ArraySystem.Array | VT_SAFEARRAY |

When a method returns an object, the object can be of one of the following managed data types (the variant type is shown just for information):

| Managed Type | Variant Type |
| --- | --- |
| System.Int32 | VT_I4 |
| System.Int64 | VT_I8 |
| System.Guid | N/A |
| System.Boolean | VT_BOOL |
| System.Double | VT_R8 |
| System.DateTime | VT_DATE |
| System.String | VT_BSTR |
| ServerObject | VT_SERVER |
| ServerRecord | VT_RECORD |
| ServerContainer | VT_CONTAINER |

The following provides examples of some of the methods, used for the managed application programming interfaces within the managed application programming interface layer 302 and corresponding unmanaged API methods. Each of the classes provides a method to invoke the corresponding unmanaged request to perform a function in response to the managed API call, as described above. Although X++ style notation is used to described the schemas, the schemas are not limited thereto.

The Server class may include the following methods:

| Managed Method | Unmanaged Method | Function |
| --- | --- | --- |
| CallJob | CallJob | Calls the Server job with the specified job name. |
| CallStaticClassMethod | CallStaticClassMethod | Calls a static member method of an Server class and |
| | CallStaticClassMethodEx | returns the returned object. |
| CallStaticRecordMethod | CallStaticRecordMethod | Calls a static member method of a record and returns |
| | CallStaticRecordMethodEx | the returned object. |

-continued

| Managed Method | Unmanaged Method | Function |
| --- | --- | --- |
| CreateClassBuffer | CreateBuffer | Creates an ServerBuffer object and returns the ServerBuffer object. The ServerBuffer object may be useful for transferring files or binary data and can be used with ServerContainer. |
| CreateClassContainer | CreateContainer | Creates an ServerContainer object and returns the ServerContainer object. The ServerContainer object corresponds to the container in X++ language. ServerContainer may be used to store numbers, text strings, records, containers, etc. |
| CreateClassObject | CreateObject CreateObjectEx | Creates an ServerObject object and returns the created ServerObject object. |
| CreateClassRecord | CreateRecord | Creates an ServerRecord object and returns the ServerRecord object. |
| ExecuteStmt | ExecuteStmt ExecuteStmtEx | Executes a statement on the specified ServerRecord objects. The statement may be an X++ statement. A valid a statement could be: select * from %1 where %2.Name == 'Server'. This statement uses two ServerRecord objects, one for %1 (record1) and one for %2 (record2). The %-signs may be automatically substituted with the corresponding record names. |
| GetObject | GetObject | Creates an ServerObject object and attaches it to one of the global objects found in the X++ language and returns the ServerObject object. |
| Logoff | Logoff | Disconnects from the server system 202. If Server.Logoff is not called before disposing the object then the Server.Logoff method is automatically called by the object to ensure proper disconnection from the server system 202. Invoking this method will cause all the ServerObjects, ServerRecords, ServerBuffers and ServerContainers specific to the session to be disposed. Returns "true" if successful; "false" if the object was not logged on, so Logoff succeeds by default. |
| Logon | Logon | Connects to the server system 202. |
| LogonAs | LogonAs | Connects to the server system 202 on behalf of a user. |
| Refresh | Refresh | Clears the internal memory cache, including the cached database information. The method may be used during development to make the object reread the application code without having to logoff. Calling the Refresh( ) method may clear all internal cache, this method may not be called each time a user logs on to a web site.<br>void Refresh( ). |
| TTSAbort | TTSAbort | Calls the ttsabort function of the X++ language. This method may be used to abort a transaction started using Server.TTSBegin. |
| TTSBegin | TTSBegin | Calls the ttsbegin function of the X++ language. This method may be used to start a transaction that can be either committed (Server.TTSCommit) or aborted (Server.TTSAbort). TTSBegin (and TTSCommit/TTSAbort) may be used for update and delete operations, otherwise an XppException may be raised. |
| TTSCommit | TTSCommit | Calls the ttscommit function of the X++ language. This method may be used to commit a transaction started using Server.TTSBegin. TTSBegin (and TTSCommit/TTSAbort) may be used for update and delete operations, otherwise an XppException may be raised. |

The ServerBuffer class may include the following methods:

| Managed Method | Unmanaged Method | Function |
| --- | --- | --- |
| GetData | GetData | Reads data from an ServerBuffer. |
| SetData | SetData | Writes data to an ServerBuffer. |
| Size | GetSize | Returns the size of the ServerBuffer (in bytes). |

The ServerObject class may include the following methods:

| Managed Method | Unmanaged Method | Function |
| --- | --- | --- |
| Call | Call CallEx | Calls a member method of a ServerObject object. Returns the object that contains the result code. |

The ServerRecord class may include the following methods:

| Managed Method | Unmanaged Method | Function |
| --- | --- | --- |
| Call | Call<br>CallEx | Calls a member method of the ServerRecord record. Returns the object that contains the result code. |
| Clear | Clear | Clears the contents of the ServerRecord object. This method resembles calling the clear member method of a record in the X++ language. |
| Delete | Delete | Deletes the ServerRecord. This method resembles calling the delete member method of a record in the X++ language. |
| DoDelete | DoDelete | Deletes the ServerRecord. This method resembles calling the doDelete member method of a record in the X++ language. Calling this method may ensure that any X++ code written in the delete member method of the record is not executed, whereas ServerRecord.Delete may always call the X++ code written in the delete member method. |
| DoInsert | DoInsert | Inserts the ServerRecord record into the database. This method resembles calling the doInsert member method of a record in the X++ language. Calling this method may ensure that any X++ code written in the insert member method of the record is not executed, whereas ServerRecord.Insert may always call the X++ code written in the insert member method. |
| DoUpdate | DoUpdate | Updates the ServerRecord record and persists the changes to the database. This method resembles calling the doUpdate member method of a record in the X++ language. Calling this method may ensure that any X++ code written in the update member method of the record is not executed, whereas ServerRecord.Update may always call the X++ code written in the update member method. |
| ExecuteStmt | ExecuteStmt | Executes a statement on the ServerRecord. |
| Field | get_Caption<br>get_Company<br>get_Field | An indexed property that is used to retrieve and store the value of the specified field in the ServerRecord. Returns the object that contains the returned value. |
| FieldLabel | get_FieldLabel | An indexed property that is used to retrieve the value of the field label for a field in an ServerRecord. Returns the field label string. |
| Found | get_Found | Retrieves the status of the ServerRecord. When ServerRecord.ExecuteStmt or ServerRecord.Next has been called this property method indicates whether a record was found or not. Returns True: Success - record found; False: Success - record not found. |
| HelpField | get_HelpField | An indexed property that is used to retrieve the value of the help label for a field in an ServerRecord. Returns the help label for the specified field. |
| InitValue | InitValue | Initializes the fields of the ServerRecord record. This method resembles calling the initValue member method of a record in the X++ language. Each table has a default X++ initValue method. This method may be invoked when calling ServerRecord.InitValue from the managed interoperability component. |
| Insert | Insert | Inserts the record being transferred to the database. This method resembles calling the insert member method of a record in the X++ language. |
| Next | Next | Retrieves the next ServerRecord. This method may be used to enumerate the ServerRecords selected when ServerRecord.ExecuteStmt has been called. Returns True: Success - next record found; False: Success - next record not found. |
| PostLoad | PostLoad | When a record is read from the database the postLoad member method of the record is automatically called by server system 202. The X++ programmer may then overload the postLoad member method to accomplish specific behavior. Calling ServerRecord.PostLoad may also call the postLoad member method of the record. This method resembles calling the postLoad member method of a record in the X++ language. |
| ReRead | Reread | Rereads the fields of the Server record. This method resembles calling the reread member method of a record in the X++ language. |
| TooltipField | get_TooltipField | An indexed property that is used to retrieve the value of the tool tip label for a field in an ServerRecord. Returns the tool tip string for the specified field. |
| TooltipRecord | get_TooltipRecord | Retrieves the tool tip label of the ServerRecord. This method resembles calling the toolTipRecord member method of a record in the X++ language. Returns the tool tip string for the ServerRecord. |
| Update | Update | Updates the ServerRecord object. |
| ValidateDelete | ValidateDelete | Checks whether the ServerRecord can be deleted. This method resembles calling the validateDelete member method of a record in the X++ language. Returns True: Success - record can be deleted; False: Success - record cannot be deleted. |
| ValidateField | ValidateField | Checks whether the specified field of the ServerRecord is valid. This method resembles calling the validateField member method of a record in the X++ language. Returns True: Success - field is valid; False: Success - field is not valid. |

-continued

| Managed Method | Unmanaged Method | Function |
| --- | --- | --- |
| ValidateWrite | ValidateWrite | Checks whether the ServerRecord can be written. This method resembles calling the validateWrite member method of a record in the X++ language. Returns True: Success - field can be written; False: Success - field cannot be written. |
| Write | Write | Writes the ServerRecord to the database. This method resembles calling the write member method of a record in the X++ language. |

Figure 6:
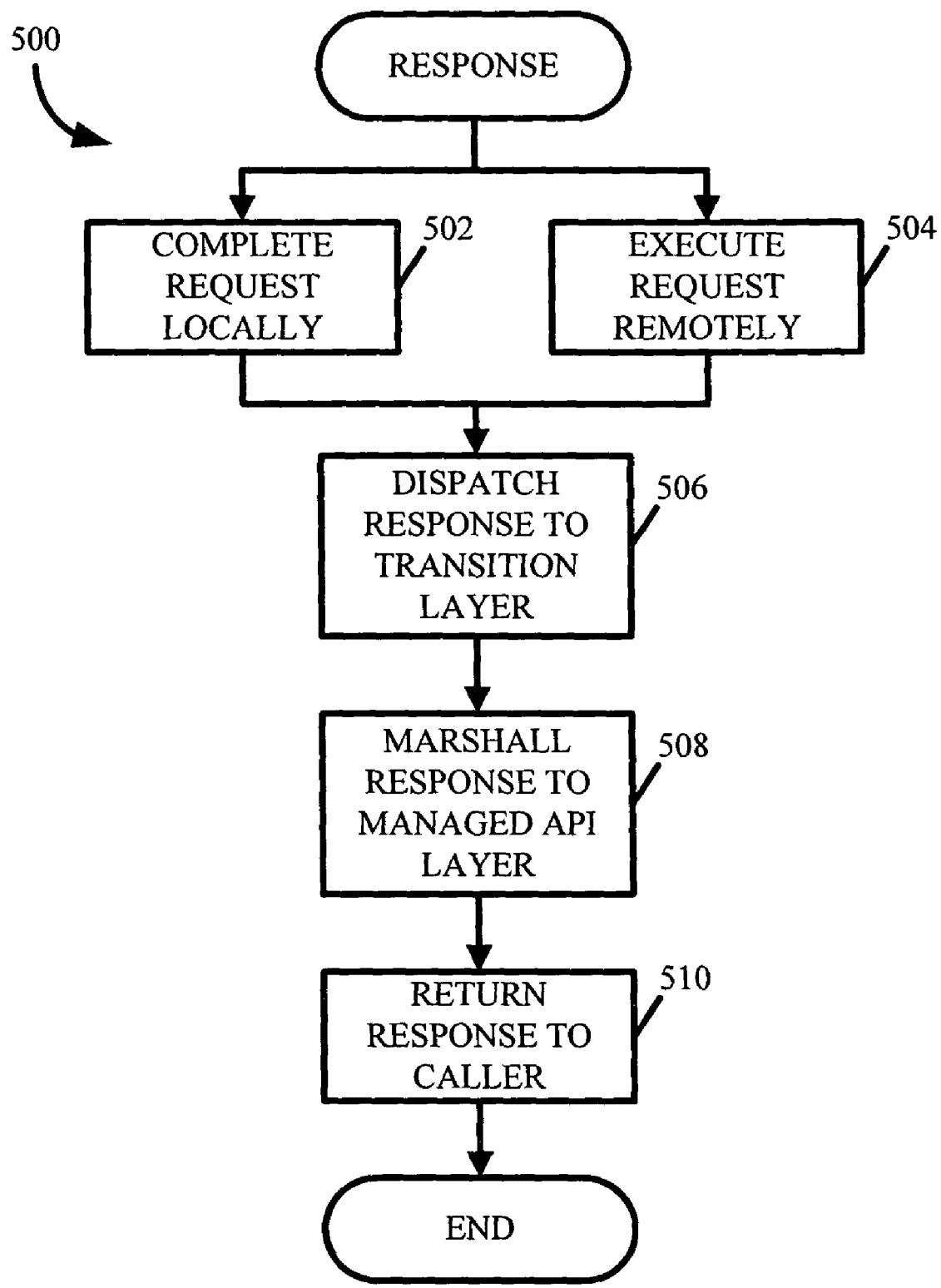
FIG. 6 is a flowchart representative of a routine for traversing a response to the request through the logical layers of FIG. 4.

FIG. 6 is an example of a routine 500 which may be executed all or in part in the interoperability component kernel, and which may be utilized to receive an unmanaged response to the unmanaged API call, marshal the response from the unmanaged layer to the managed layer and return a managed response to the client. Beginning at blocks 502 and 504, the request may be completed by the unmanaged programming language interpreter either locally in the managed interoperability component or remotely in the application object server, respectively. An unmanaged response corresponding to the completed request may be dispatched to the transition layer 306 at block 506.

At block 508, the transition layer 306 may marshal the response from the unmanaged programming language interpreter layer 308 to the managed API implementation layer 304. In particular, the transition layer 306 may map the parameters, data types and/or data objects of the response from unmanaged to corresponding managed parameters, data types and/or data objects such that the data object is understood by the managed client application. Marshalling the response may be performed in a similar manner as provided for marshalling the managed API call, with the exception that the mapping occurs from an unmanaged response to a corresponding managed response. Once all of the unmanaged parameters have been mapped to managed parameters, the unmanaged data types have been mapped to managed data types and the unmanaged data objects have been mapped to managed data objects, as needed, the transition layer 306 dispatches the managed response to the managed API implementation layer 304, and at block 510 the managed API implementation layer forwards the managed response to the managed client application.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

What is claimed is:

1. A computer storage medium having computer-executable instructions for implementing a method of accessing unmanaged programming logic in response to a managed application, the computer executable instructions comprising instructions for:

receiving a managed application programming interface call from a managed application written in a managed language at a transition layer via a managed application programming interface implementation layer;

type marshalling, at the transition layer, the managed application programming interface call from the managed application programming interface implementation layer to an unmanaged programming language interpreter layer, wherein type marshalling comprises mapping the managed application programming interface call directly from a managed layer to a corresponding equivalent unmanaged application programming interface call in an unmanaged layer without the use of a wrapper interface support by bringing the managed application programming interface call from the managed layer to the unmanaged layer and avoiding mapping through unmanaged interoperability standard;

dispatching a request associated with the unmanaged application programming interface call to the unmanaged programming language interpreter layer; and interpreting the request associated with the unmanaged application programming interface call with the unmanaged programming language interpreter layer.

2. The computer storage medium having computer-executable instructions of claim 1, wherein mapping the managed application programming interface call directly from a managed layer to an unmanaged application programming interface call without the use of a wrapper interface support comprises mapping a managed data object of the managed application programming interface call directly to a corresponding unmanaged data object of the unmanaged application programming interface call.

3. The computer storage medium having computer-executable instructions of claim 1, wherein mapping the managed application programming interface call directly from a managed layer to an unmanaged application programming interface call without the use of a wrapper interface support comprises mapping a managed datatype of the managed application programming interface call directly to a corresponding unmanaged datatype of the unmanaged application programming interface call.

4. The computer storage medium having computer-executable instructions of claim 1, wherein mapping the managed application programming interface call directly from a managed layer to an unmanaged application programming interface call without the use of a wrapper interface support comprises mapping a managed parameter of the managed application programming interface call directly to a corresponding unmanaged parameter of the unmanaged application programming interface call.

5. The computer storage medium having computer-executable instructions of claim 1, further comprising instructions for:

executing the request associated with the unmanaged application programming interface call in an unmanaged programming language to generate an unmanaged response;

mapping the unmanaged response to a corresponding managed response; and
providing the managed response to the managed application.

6. The computer storage medium having computer-executable instructions of claim 1, wherein interpreting the request associated with the unmanaged application programming interface call with an unmanaged programming language interpreter layer comprises interpreting the request in the unmanaged layer comprising the unmanaged programming language interpreter layer.

7. The computer storage medium having computer-executable instructions of claim 1, wherein the unmanaged programming language comprises X++.

8. A method of communicating between a requesting process comprising a first type system and a serving process comprising a second type system different from the first type system, the method comprising:
processing an application programming interface call based on the first type system from a managed application written in a programming language based on the first type system;
type marshalling, at a transition layer, the application programming interface call based on the first type system from a managed application programming interface implementation layer to an unmanaged interpreter layer, wherein type marshalling comprises mapping the managed application programming interface call directly to a corresponding equivalent application programming interface call in an unmanaged layer based on the second type system without the use of a wrapper interface support bringing the managed application programming interface call from the managed layer to the unmanaged layer and avoiding mapping through unmanaged interoperability standard; and
executing a request associated with the application programming interface call based on the second type system using a programming language based on the second type system.

9. The method of claim 8, wherein the programming language based on the first type system comprises a managed programming language and the programming language based on the second type system comprises an unmanaged programming language.

10. The method of claim 8, wherein processing a managed application programming interface call comprises:
issuing, by the requesting process, an application programming interface call based on the first type system for a managed application programming interface method based on the first type system; and
receiving, by the serving process, the managed application programming interface call based on the first type system.

11. The method of claim 8, wherein executing a request associated with the application programming interface call based on the second type system comprises:
executing, by the serving process, the request based on the second type system in response to the application programming interface call based on the second type system; and
issuing, by the serving process to the requesting process, a response based on the first type system corresponding to the response based on the second type system.

12. The method of claim 11, further comprising marshalling, by the serving process, the response based on the second type system to the corresponding response based on the first type system.

13. The method of claim 8, wherein type marshalling, at a transition layer, the application programming interface call based on the first type system from a managed application programming interface implementation layer to an unmanaged interpreter layer comprises marshalling, by the serving process, the application programming interface call from a programming language based on the first type system directly to a programming language based on the second type system.

14. The method of claim 8, wherein type marshalling, at a transition layer, the application programming interface call based on the first type system from a managed application programming interface implementation layer to an unmanaged interpreter layer comprises mapping, by the serving process, a data object of the first type system directly to an data object of the second type system.

15. The method of claim 8, wherein type marshalling, at a transition layer, the application programming interface call based on the first type system from a managed application programming interface implementation layer to an unmanaged interpreter layer comprises mapping, by the serving process, a datatype of the first type system directly to a datatype of the second type system.

16. The method of claim 8, wherein type marshalling, at a transition layer, the application programming interface call based on the first type system from a managed application programming interface implementation layer to an unmanaged interpreter layer comprises mapping, by the serving process, a parameter of the first type system directly to a parameter of the second type system.

17. A computer adapted for participation in an enterprise resource planning network, the computer comprising:
a network communication device for receiving data via a network;
a memory storing machine-readable instructions; and
a processor for executing the machine-readable instructions performing a method comprising:
receiving a call from a managed application written in a managed programming language at a managed application programming interface layer;
implementing the unmanaged application programming interface layer at a managed application programming interface implementation layer by taking the call from the managed application programming interface layer and passing the call to a transition layer;
type marshalling, at the transition layer, the call from the managed application programming interface layer to an unmanaged interpreter layer, wherein type marshalling comprises mapping the call directly from a managed layer to a corresponding equivalent unmanaged call in an unmanaged layer without the use of a wrapper interface support by bringing the managed call from the managed layer to the unmanaged layer and avoiding mapping through unmanaged interoperability standard;
interpreting a request associated with the call with an unmanaged programming language interpreter at an unmanaged interpreter layer; and
executing the request associated with the call in an unmanaged programming language.

18. The computer of claim 17, wherein receiving a call comprises receiving a managed call and the request is associated with an unmanaged call, wherein the instructions for type marshalling the call comprise instructions for:
mapping a data type of the managed call to a corresponding data type of an unmanaged call at a transition layer; and
dispatching the request associated with the unmanaged call to the unmanaged programming language interpreter.

* * * * *